Feb. 13, 1951  H. M. BADGER  2,541,321
HEATING SYSTEM FOR CONTAINERS
Filed May 21, 1947
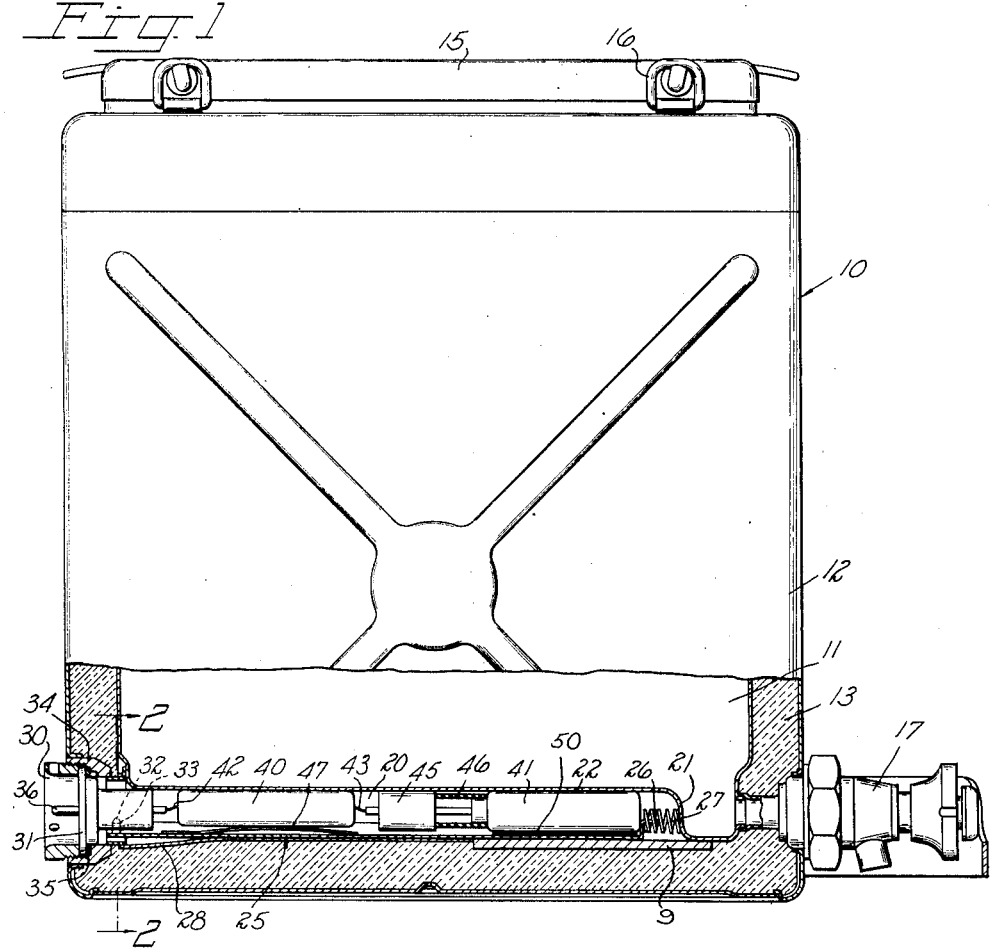
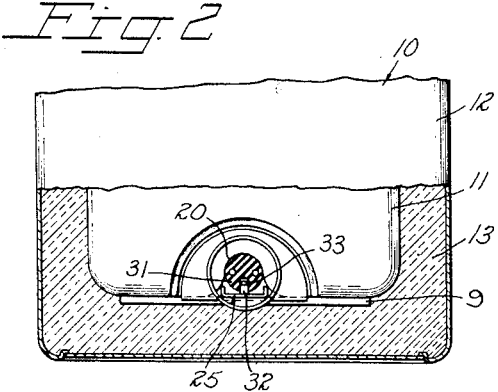
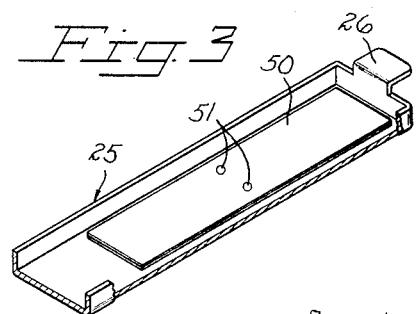
Inventor
HARRY M. BADGER
By T. Clay Lindsey
Attorney Patented Feb. 13, 1951

2,541,321

UNITED STATES PATENT OFFICE 2,541,321

HEATING SYSTEM FOR CONTAINERS

Harry M. Badger, New Britain, Conn., assignor to Landers, Frary & Clark, New Britain, Conn., a corporation of Connecticut Application May 21, 1947, Serial No. 749,418

4 Claims. (Cl. 219—44)

1

The present invention relates to a heating system, and more particularly to an electric heater and thermostat construction for fluid containers. While the invention is of general utility, it is particularly applicable to portable thermos containers of the type frequently used by airlines for providing heated beverages for passengers.

It is an object of the present invention to provide a heating system for containers which includes a compact electrical heating unit and thermostat adapted to operate with maximum efficiency so that the desired heating and control thereof is accomplished with a small installation and one which is not wasteful of electrical energy.

A further object of the invention is to provide a heating arrangement of the character referred to which is easy to assemble and disassemble whereby the elements of the apparatus may be withdrawn for replacement and repair or inspection whenever desired.

A further object of the invention is to provide a heating arrangement having the compactness and the ease of assembly and disassembly referred to and which has an efficiency of operation comparable to that of permanent heating installations.

Another object of the invention is to provide a heating arrangement of the type described which is simple and economical to manufacture and which utilizes a minimum of expensive parts.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawing—

Figure 1 is a side view partially in cross section of a fluid container embodying the heating arrangement of the present invention;

Fig. 2 is a fragmentary, cross sectional view taken along the line 2—2 of Fig. 1; and Fig. 3 is a fragmentary, perspective view partially in cross section of a removable positioning tray which is utilized in the embodiment of the invention shown.

Referring to the drawing, the reference numeral 10 denotes generally a fluid container of the type which is frequently utilized by airlines to provide heated beverages for passengers. The fluid container 10 is of the double wall type comprising an inner fluid container 11 and an outer casing 12 with suitable insulating material 13 therebetween. The container is generally rectangular in shape and is provided with a filler opening at the top which is closed by the removable cover 15 secured thereon by bails 16. Communicating with the inner fluid container 11 is a tap 17 through which liquid may be withdrawn from the container.

In accordance with the present invention, the bottom of the inner fluid container 11 is utilized as a heating surface and is bifurcated to form a central longitudinal groove 20 extending from one end to a shoulder 21 adjacent the tap 17, thus providing a pocket 22 between the container and the insulating portion 13.

Further, in accordance with the invention, the pocket 22 is constructed and arranged to permit the insertion of a removable tray 25 by sliding it along underneath the longitudinal groove 20. The bottom is inclined slightly at 28 to facilitate the insertion of the tray. This tray 25 is provided with an extension or finger 26 for positioning a spring 27 which is compressed against the shoulder 21 when the tray 25 is fully inserted into the pocket formed by the longitudinal groove 20 and which aids in the removal of the tray 25, the action being such that the spring 27 will normally push the tray 25 outwardly from the pocket beneath the groove 20 a sufficient distance so that it may readily be grasped by the operator thus enabling him to withdraw the tray.

The tray is held in place by a threaded nut 30 in which is rotatably received the outer end of an electrical connector 31 which, in turn, is engaged by the tray 25 by a pin 32 extending upwardly into an opening 33 in the connector 31. The threaded nut 30 is threadably received in a bushing 34 which is secured to the outer casing 12 at the opening to the pocket 22 beneath the groove 20. The threaded nut 30 is provided with a rubber washer 35 to insure that a water-tight connection may be made with the casing 12. The electrical connector 31 is formed with prongs 36 by means of which the heating unit and heat control unit to be described hereafter may be connected to a suitable source of electric power (not shown in the drawing) such as the conventional 24 volt circuit generally provided in commercial aircraft. Inasmuch as the connector 31 is secured to the tray 25 by pin 32 and tray 25 is constantly urged outwardly by spring 27, a good electrical contact is assured which will not become disconnected by vibration.

Removably positioned on the tray 25 are a thermostat 40 and an electric heating unit 41 which are generally cylindrical in shape so as to readily fit within the longitudinal groove 20. For simplicity of presentation, only one heating unit 41 is shown in the drawing. If desired, a plurality of heating units operating at the same or different voltages may be substituted for the single unit 41 as will be readily apparent to one skilled in the art. The thermostat 40 is of special design for the purposes of the present invention and is characterized by the location of the inlet and outlet wires 42 and 43, respectively, at opposite ends of the thermostat. The inlet wires 42 are secured to the connector 31 and therethrough to the prongs 36. The outlet wires 43 are connected to a second electrical connector 45 which, in turn, is connected to the electric heating unit 41 and is spaced therefrom by an insulating tube 46.

The tray 25 is provided with a leaf spring 47 secured at one end to the tray 25 which yieldingly places a slight upward pressure on the thermostat 40. The pressure exerted by the leaf spring 47 is not sufficient to interfere with the easy withdrawal and insertion of the tray 25 and contents thereof, but is sufficient to insure a good thermal contact between the thermostat 40 and the surface of the inner fluid container 11 at the longitudinal groove 20 to insure satisfactory performance of the thermostat.

In accordance with the invention, the heating unit 41 is seated on top of a bi-metallic plate 50 which is secured intermediate its ends to the bottom of the tray 25 as, for example, by spot welding at 51. The bi-metallic plate 50 is so formed that at ordinary room temperatures the plate lies flat along the bottom of the tray 25, as shown in the drawing. When the bi-metallic plate 50 is in this condition, the electric heating unit 41 clears the top of the longitudinal groove 20 so that there is no interference to the withdrawal or insertion of the unit into operating position. However, when the heating unit is energized and heat is generated, the resultant rise in temperature of the bi-metallic plate 50 causes the ends of the plate to bend upwardly thereby pressing the heating unit 41 firmly against the surface of the longitudinal groove 20 causing an efficient heat transfer relationship between the unit and the container 11.

Further, in accordance with the invention, there is provided a plate 9 of relatively high heat conductivity, such as a copper plate, extending transversely of the bottom of the inner fluid container 11 and extending across the bottom of the groove 20 adjacent the heating unit 41. The effect of this conducting plate is to transfer and spread out the heat generated by the heating unit 41 to as large an area of the fluid container 11 as possible, thereby greatly increasing the efficiency of the device.

In order to disassemble the device, it is only necessary to turn the threaded nut 30 until it is disengaged from the bushing 34 whereupon the spring 27 will eject the tray 25 a sufficient distance so that it may be readily grasped and removed by hand. The connectors 31 and 45, thermostat 40 and heating unit 41 may then be lifted off the tray and further disassembled if desired. To reassemble the device, it is only necessary to reverse the procedure with the connectors, thermostat and heating unit being replaced on the tray, the tray being reinserted into the pocket 22 and the nut 30 being turned to engage the bushing 34. When the electrical power is turned on, the generation of heat immediately locks the heating unit 41 into most efficient heating position, i. e., firmly against the heating surface of the inner container 11.

It thus will be seen that, in accordance with the present invention, there has been provided a heating arrangement for fluid containers which is of compact and efficient construction and which is particularly characterized by the ease with which the heating arrangement may be assembled and disassembled combined with the fact that the efficiency of the arrangement is not deleteriously affected by this provision for assembly and disassembly and with the result that the heating results obtained are substantially the equivalent of arrangements in which the heating unit and the heating controls are permanently installed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A heating system for beverage containers of the thermos type comprising a double walled container formed of an inner container and an outer casing with an insulating area therebetween, a groove in the bottom of the inner container forming a pocket therebeneath, an opening in the casing in substantial register with one end of said groove, an assembly comprising a tubular heating unit and a tubular casing containing a thermostatically operated switch for controlling the heating unit, said assembly being adapted to seat in alignment in said groove, a removable tray insertable into said pocket along the bottom thereof and arranged to support said assembly in seated position in said groove, and a bimetallic plate on the tray arranged to press the heating unit against the top of the groove when the unit is energized and to release the unit when cooled to permit easy removal of the tray and assembly.

2. A heating system for beverage containers of the thermos type comprising a double walled container formed of an inner container and an outer casing with an insulating area therebetween, a groove in the bottom of the inner container forming a pocket therebeneath, an opening in the casing in substantial register with one end of said groove, a removable tray insertable through said opening into said pocket along the bottom thereof, a heating and heat control assembly adapted to be seated in said groove by said tray comprising a connector at the outer end adapted to be connected to a source of electrical energy, a tubular heating unit at the inner end, and a tubular member therebetween housing a thermostatically operated switch for controlling the heating unit, means for releasably attaching the assembly to the tray, and means for releasably securing the connector at the opening of said casing.

3. A heating system for beverage containers of the thermos type comprising a double walled container formed of an inner metallic container and an outer casing with insulating material therebetween, said inner container having a bottom heating surface provided with an elongated groove therein forming a pocket therebeneath, a tubular electric heating unit adapted to seat in said groove, a removable tray for positioning the heating unit in the groove, and a bimetallic plate secured to the tray underneath the heating unit adapted when heated to press the heating unit upwardly against the top of the groove and when cooled to release the pressure sufficiently to permit easy withdrawal of the unit and tray.

4. A heating system for beverage containers of the thermos type comprising a double walled container formed of an inner metallic container and an outer casing with insulating material therebetween, said inner container having a bottom heating surface provided with an elongated groove therein forming a pocket therebeneath, a plate formed of good heat conducting metal extending across said groove and extending laterally therefrom to make substantial contact with said heating surface, a removable tray adapted to be positioned in said pocket above said plate, an electrical tubular heating unit and thermostat assembly carried by said tray, and a bimetallic plate disposed on the tray underneath the heating unit for pressing the heating unit into engagement with the top of the groove when heated, and for releasing said engagement when cooled to permit easy withdrawal of the tray.

HARRY M. BADGER.

REFERENCES CITED

The following references are of record in the file of this patent:

UNITED STATES PATENTS

| Number | Name | Date |
|---|---|---|
| 1,649,506 | Brewer | Nov. 15, 1927 |
| 1,681,099 | Clark | Aug. 14, 1928 |
| 1,713,249 | Abbott et al. | May 14, 1929 |
| 2,302,775 | Johnson | Nov. 24, 1942 |